(12) United States Patent
Hu et al.

(10) Patent No.: US 11,997,521 B2
(45) Date of Patent: May 28, 2024

(54) COMMUNICATION METHOD FOR DUAL CONNECTIVITY, AND NETWORK DEVICE

(71) Applicant: GUANGDONG OPPO MOBILE TELECOMMUNICATIONS CORP., LTD., Guangdong (CN)

(72) Inventors: Rongyi Hu, Dongguan (CN); Shukun Wang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 320 days.

(21) Appl. No.: 17/452,957

(22) Filed: Oct. 29, 2021

(65) Prior Publication Data
US 2022/0053356 A1 Feb. 17, 2022

Related U.S. Application Data

(63) Continuation of application No. PCT/CN2019/086710, filed on May 13, 2019.

(51) Int. Cl.
*H04W 76/15* (2018.01)
*H04W 24/10* (2009.01)

(52) U.S. Cl.
CPC .......... *H04W 24/10* (2013.01); *H04W 76/15* (2018.02)

(58) Field of Classification Search
CPC . H04W 24/10; H04W 76/15; H04W 36/0027; H04W 36/0058; H04W 88/06
See application file for complete search history.

(56) References Cited

U.S. PATENT DOCUMENTS

2015/0271811 A1 9/2015 Kim et al.
2016/0338137 A1 11/2016 Mishra et al.
(Continued)

FOREIGN PATENT DOCUMENTS

CN 105684543 A 6/2016
CN 106063342 A 10/2016
(Continued)

OTHER PUBLICATIONS

Decision of Rejection for Chinese Application No. 202110817548.5 dated Feb. 21, 2023. 16 pages with English translation.
(Continued)

*Primary Examiner* — Chuong A Ngo
(74) *Attorney, Agent, or Firm* — PERKINS COIE LLP (57) ABSTRACT

The embodiments of the present disclosure relate to a communication method for dual connectivity, and a network device. The method comprises: a first node sending first indication information to a second node, the first indication information being used for indicating a first number and/or a first actual limit value, wherein the first number is the number of reporting conditions, configured by the first node, for first cell measurement; the first actual limit value is the actual maximum number of reporting conditions, which can be configured by the second node, for second cell measurement; and the first node and the second node are respectively nodes of the first cell and the second cell in a dual-connectivity network in which a terminal device is located. The communication method for dual connectivity, and the network device of the embodiments of the present disclosure can reduce signaling overheads.

20 Claims, 3 Drawing Sheets

(56) References Cited

U.S. PATENT DOCUMENTS

| | | | |
|---|---|---|---|
| 2017/0034709 A1 | 2/2017 | Hapsari et al. | |
| 2019/0058508 A1* | 2/2019 | Yiu | H04B 17/336 |
| 2022/0014953 A1* | 1/2022 | Teyeb | H04W 24/10 |
| 2022/0149922 A1* | 5/2022 | Wang | H04W 76/19 |

FOREIGN PATENT DOCUMENTS

| | | | |
|---|---|---|---|
| CN | 106165475 A | 11/2016 | |
| CN | 108632851 A | 10/2018 | |
| CN | 108633018 A | 10/2018 | |
| CN | 108882285 A | 11/2018 | |
| CN | 109151921 A | 1/2019 | |
| EP | 3139672 A1 | 3/2017 | |
| WO | 2013052805 A1 | 4/2013 | |
| WO | 2018211170 A1 | 11/2018 | |

OTHER PUBLICATIONS

Ericsson "Inter-node RRC messages for NE-DC (and TP to 37.340)" Tdoc R2-1812019; 3GPP TSG-RAN WG2 #103; Gothenburg, Sweden; Aug. 20-24, 2018. 12 pages.

Examination Report No. 1 for Australian Application No. 2019446198 dated Aug. 29, 2022. 3 pages.

Notice of Reasons for Refusal for Japanese Application No. 2021-566541 dated Oct. 28, 2022. 6 pages with English translation.

Examination Report of the European application No. 19928936.4 dated Jul. 20, 2023, 6 pages.

Office Action of the Vietnam application No. 1-2021-07880 dated Sep. 25, 2023, 4 pages with English translation.

Examination Report for European Application No. 19928936.4 dated Jan. 24, 2023. 6 pages.

First Office Action for Chinese Application No. 20110817548.5 dated Nov. 18, 2022. 20 pages with English translation.

3GPP "Evolved Universal Terrestrial Radio Access (E-UTRA) and NR; Multi-connectivity; Stage 2 (Release 15)" 3GPP Technical Specification 37.340 V15.5.0; Mar. 2019. 68 pages.

Examination Report for Indian Application No. 202127053943 dated Apr. 29, 2022. 5 pages with English translation.

Extended European Search Report for European Application No. 19928936.4 dated Mar. 29, 2022. 10 pages.

NEC Corporation "Other Inter-node RRC messages for DC" R2-141283; 3GPP TSG RAN 2 Meeting #85b; Valencia, Spain; Mar. 31-Apr. 4, 2014. 6 pages.

Nsn et al. "RRM measurements for Dual Connectivity" R2-140374; 3GPP TSG-RAN WG2 Meeting #85; Prague, Czech Republic; Feb. 10-14, 2014. 5 pages.

International Search Report dated Jan. 22, 2020 in App. No. PCT/CN2019/086710, Jan. 22, 2020, 4 pp.

Hearing Notice of the IN application No. 202127053943, issued on Feb. 19, 2024. 3 pages.

* cited by examiner

COMMUNICATION METHOD FOR DUAL CONNECTIVITY, AND NETWORK DEVICE

CROSS-REFERENCE TO RELATED APPLICATION

This application is a continuation application of International PCT Application No. PCT/CN2019/086710 filed on May 13, 2019, the entire content of which is hereby incorporated by reference.

TECHNICAL FIELD

The present disclosure relates to the field of communication, particularly to a communication method for dual connectivity and a network device.

BACKGROUND

A dual connectivity network is a research hotspot of wireless communication technology at present. The dual connectivity network may include a Master Node (MN) and a Secondary Node (SN), and a terminal device may be connected with the MN and the SN at the same time.

In the dual connectivity network, the MN and the SN may configure, for the terminal device, reporting criteria for a cell measurement. In this case, how to reduce signaling overhead of configuring the reporting criteria for the terminal device is an urgent problem to be solved.

SUMMARY

Embodiments of the present disclosure provide a communication method for dual connectivity and a network device, which may reduce signaling overhead.

In a first aspect, a communication method for dual connectivity is provided, including: sending, by a first node, first indication information to a second node, wherein the first indication information is used for indicating a first quantity and/or a first actual limit value, wherein the first quantity is a quantity of reporting criteria for measurement on a first cell configured by the first node, the first actual limit value is an actual maximum quantity of reporting criteria for measurement on a second cell configurable by the second node, and the first node and the second node are respectively nodes of the first cell and the second cell under a dual connectivity network in which a terminal device is located.

In a second aspect, a communication method for dual connectivity is provided, including: receiving, by a second node, first indication information sent by a first node, wherein the first indication information is used for indicating a first quantity and/or a first actual limit value, wherein the first quantity is a quantity of reporting criteria for measurement on a first cell configured by the first node, the first actual limit value is an actual maximum quantity of reporting criteria for measurement on a second cell configurable by the second node, and the first node and the second node are respectively nodes of the first cell and the second cell under a dual connectivity network in which a terminal device is located.

In a third aspect, a network device is provided, configured to perform the method in the above first aspect or each implementation thereof.

Specifically, the network device includes function modules for performing the method in the above first aspect or each implementation thereof.

In a fourth aspect, a network device is provided, configured to perform the method in the above second aspect or each implementation thereof.

Specifically, the network device includes function modules for performing the method in the above second aspect or each implementation thereof.

In a fifth aspect, a network device is provided, including a processor and a memory. The memory is configured to store a computer program, and the processor is configured to call and run the computer program stored in the memory to execute the method in the above first aspect or each implementation thereof.

In a sixth aspect, a network device is provided, including a processor and a memory. The memory is configured to store a computer program, and the processor is configured to call and run the computer program stored in the memory to execute the method in the above second aspect or each implementation thereof.

In a seventh aspect, an apparatus is provided, configured to implement the method in any one of the above first to second aspects or each implementation thereof.

Specifically, the apparatus includes a processor, configured to call and run a computer program from a memory, so that a device provided with the apparatus performs the method in any one of the above first to second aspects or each implementation thereof.

Optionally, the apparatus is a chip.

In an eighth aspect, a computer readable storage medium is provided, configured to store a computer program, wherein the computer program causes a computer to perform the method in any one of the above first to second aspects or each implementation thereof.

In a ninth aspect, a computer program product is provided, including computer program instructions, wherein the computer program instructions cause a computer to perform the method in any one of the above first to second aspects or each implementation thereof.

In a tenth aspect, a computer program is provided, which, when run on a computer, causes the computer to perform the method in any one of the above first to second aspects or each implementation thereof.

In the above technical solution, the first node sends to the second node indication information indicating the quantity of reporting criteria for measurement on the first cell configured by the first node and/or the actual maximum quantity of reporting criteria for measurement on the second cell configurable by the second node, so that the second node may determine, based on the indication of the indication information, the quantity of reporting criteria for measurement on the first cell and/or the second cell that may be configured by itself, avoiding that the total quantity of reporting criteria configured by the first node and the second node exceeds a maximum quantity that the terminal device may tolerate, which may thereby reduce signaling overhead.

DETAILED DESCRIPTION

Figure 1:
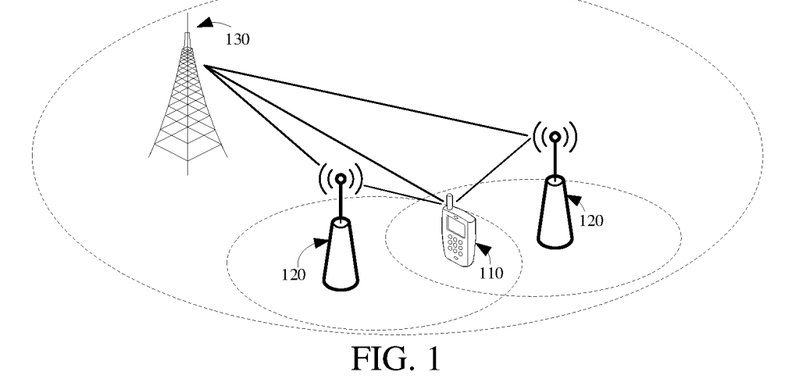
FIG. 1 is a schematic diagram of an architecture of a communication system according to an embodiment of the present disclosure.

FIG. 1 is a schematic diagram of a system 100 of an embodiment of the present disclosure.

As shown in FIG. 1, a terminal device 110 is connected to a first network device 130 under a first communication system and a second network device 120 under a second communication system. For example, the first network device 130 is a network device under Long Term Evolution (LTE), and the second network device 120 is a network device under New Radio (NR).

Herein, the first network device 130 and the second network device 120 may include multiple cells.

It should be understood that FIG. 1 is an example of a communication system according to an embodiment of the present disclosure, and the embodiment of the present disclosure is not limited to that shown in FIG. 1.

As an example, a communication system to which the embodiment of the present disclosure is adapted may include at least multiple network devices under the first communication system and/or multiple network devices under the second communication system.

For example, the system 100 shown in FIG. 1 may include one primary network device under a first communication system and at least one secondary network device under a second communication system. The at least one secondary network device is respectively connected with the one primary network device to form multi-connection, and is respectively connected with the terminal device 110 to provide a service for it. Specifically, the terminal device 110 may simultaneously establish connections through the primary network device and the secondary network device.

Optionally, the connection established between the terminal device 110 and the primary network device is a primary connection, and the connection established between the terminal device 110 and the secondary network device is a secondary connection. Control signaling of the terminal device 110 may be transmitted through the primary connection, while data of the terminal device 110 may be transmitted simultaneously through the primary connection and the secondary connection, or may be transmitted through the secondary connection only.

As another example, the first communication system and the second communication system in the embodiment of the present disclosure are different, but specific categories of the first communication system and the second communication system are not limited.

For example, the first communication system and the second communication system may be various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS), etc.

The primary network device and the secondary network device may be any access network device.

Optionally, in some embodiments, the access network device may be a Base Transceiver Station (BTS) in a Global System of Mobile Communication (GSM) system or Code Division Multiple Access (CDMA), or may be a NodeB (NB) in a Wideband Code Division Multiple Access (WCDMA) system, or may be an Evolutional Node B (eNB or eNodeB) in a Long Term Evolution (LTE) system.

Optionally, the access network device may be a base station (gNB) in a Next Generation Radio Access Network (NG RAN) or an NR system, or a radio controller in a Cloud Radio Access Network (CRAN), or the access network device may be a relay station, an access point, an on-board device, a wearable device, or a network device in a future evolved Public Land Mobile Network (PLMN), etc.

In the system 100 shown in FIG. 1, as an example, the first network device 130 is a primary network device, and the second network device 120 is a secondary network device.

The first network device 130 may be an LTE network device, and the second network device 120 may be an NR network device. Or the first network device 130 may be an NR network device, and the second network device 120 may be an LTE network device. Or both the first network device 130 and the second network device 120 may be NR network devices. Or the first network device 130 may be a GSM network device, a CDMA network device, etc., and the second network device 120 may also be a GSM network device, a CDMA network device, etc. Or the first network device 130 may be a Macrocell, and the second network device 120 may be a Microcell, a Picocell or a Femtocell, etc.

Optionally, the terminal device 110 may be any terminal device, and the terminal device 110 includes, but not limited to: an apparatus configured to receive/send a communication signal via a wired circuit connection, for example, via a Public Switched Telephone Networks (PSTN), a Digital Subscriber Line (DSL), a digital cable, or a direct cable; and/or another data connection/network; and/or via a wireless interface, for instance, for a cellular network, a Wireless Local Area Network (WLAN), a digital television network such as a DVB-H network, a satellite network, and an AM-FM broadcast sender; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal that can be combined with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved Public Land Mobile Network (PLMN), or the like.

It should be understood that the terms "system" and "network" are often used interchangeably in this document.

It should be understood that the embodiments of the present disclosure may be applied to a Dual Connectivity (DC) network, which may also be called a Multi-Radio Access Technology Dual Connectivity (MR-DC) network.

Herein, the MR-DC may include but not limited to LTE-LTE DC and 5G MR-DC, wherein, the 5G MR-DC may include LTE NR DC (EN-DC), NR LTE DC (NE-DC), 5GC LTE NR DC (5GC-EN-DC) or NR-NR DC (NR-DC).

In the LTE-LTE DC, MN and SN are both nodes of an LTE system, the SN has no Radio Resource Control (RRC) entity, basically all related measurement configurations are configured by the MN, and there may be no signaling interaction between the MN and the SN.

In the 5G MR-DC, both the MN and the SN have RRC entities, which may both generate an RRC Protocol Data Unit (PDU). An RRC message generated by the SN may be configured to the terminal device in two modes, one of which is: the RRC message generated by the SN may be sent to the MN in a form of container, and then configured by the MN to the terminal device; and another mode is: the SN directly configures the generated RRC message to the terminal device, for example, the SN may configure the RRC message to the terminal device through Signaling Radio Bearers 3 (SRBs 3).

In the EN-DC, an LTE node serves as MN, and a node of an NR system serves as SN, which are connected to an Evolved Packet Core network (EPC) core network. In the NE-DC, a node of an NR system serves as MN and LTE node serves as SN, which are connected to a 5G Core Network (5GC). In the 5GC-EN-DC, LTE node serves as MN, and a node of an NR system serves as SN, which are connected to the 5GC. In the EN-DC and the NE-DC, the MN and the SN may each respectively configure measurement configurations of corresponding LTE or NR serving cells or neighboring cells.

Figure 2:
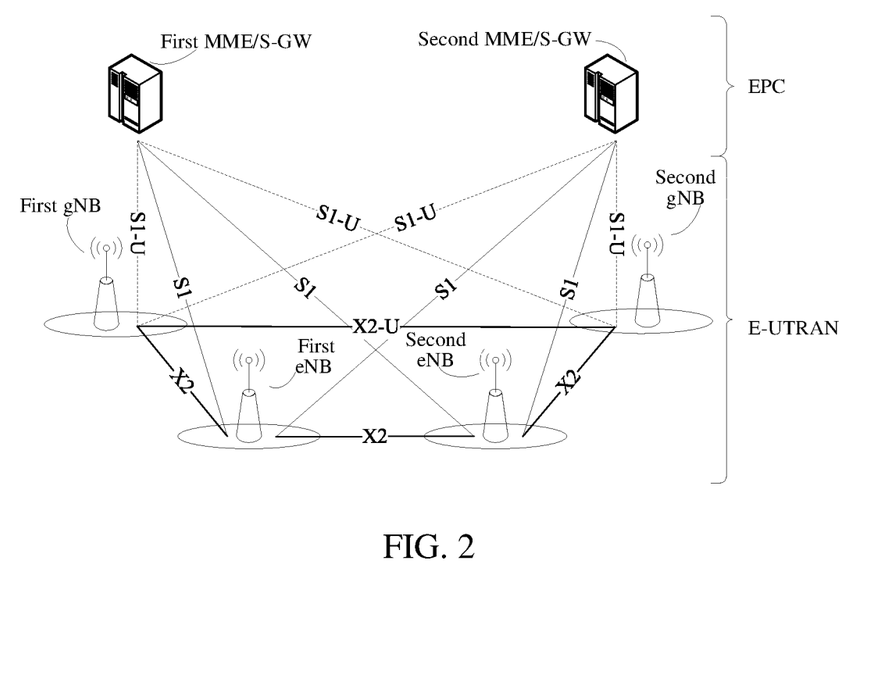
FIG. 2 is a schematic diagram of a dual connectivity network according to an embodiment of the present disclosure.

For example, a network architecture of the EN-DC may be as shown in FIG. 2, an eNB is an MN node, a gNB is an SN node, the eNB is connected with a Mobility Management Entity (MME) or a Serving Gateway (S-GW) through an S1 interface, a gNB is connected to the MME or the S-GW through an S1-U interface (user side S1 interface), two eNBs are connected through an X2 interface, two gNBs are connected through an X2-U interface (user side X2 interface), and an eNB and a gNB are connected through the X2 interface. An eNB mainly implements an RRC control function and a control plane function to CN, and a gNB may configure auxiliary signaling, such as SRB 3, which mainly provides a data transmission function.

In the NR-DC, a node of the NR system serves as MN, and a node of the NR system serves as SN, which are connected to the 5GC. For example, in the NR-DC, a node of the NR system with a working frequency band in a first frequency range (FR1) may be MN, and a node of the NR system with a working frequency band in a second frequency range (FR2) may be SN. Different from the LTE-LTE DC, MN and SN of the NR-DC are different entities, and MN and SN may share and interchange each other's configured restriction information.

In the DC network, main key technical points may include: a control plane, a user plane, security, Radio Link Failure (RLF) system broadcast reception, Radio Resource Management (RRM) coordination and terminal device capability coordination, etc.

There is an Inter-node RRC Message between MN and SN in the DC network, wherein the Inter-node RRC Message may include a CG-Config message and a CG-ConfigInfo message.

Herein, the CG-Config message may be used for saving and forwarding a Secondary Cell Group (SCG) wireless configuration message to the MN, that is, the CG-Config message is sent by the SN to the MN. The CG-Config message may be as shown below:

```
CG-Config ::=                   SEQUENCE {
    criticalExtensions              CHOICE {
      c1                              CHOICE{
        cg-Config                       CG-Config-IEs,
        spare3 NULL, spare2 NULL, spare1 NULL
      },
      criticalExtensionsFuture        SEQUENCE { }
    }
}
CG-Config-IEs ::=               SEQUENCE {
...
configRestrictModReq            ConfigRestrictModReqSCG OPTIONAL,
}
```

It may be seen that the CG-Config message includes an instruction configRestrictModReq, wherein the instruction may be used for the SN to request to change a SCG configuration restriction configured by the MN for the SN, so as to ensure that a UE capability is not exceeded. For example, there are two restriction contents defined in a current protocol: one is requestedBC-MRDC, which may be used for indicating information of a frequency band combination in an SN dual connectivity mode; and the other is requestedP-MaxFR1, which may be used for indicating a maximum power p-max of the FR1. It should be understood that these two messages may be optionally supported by a device.

The CG-ConfigInfo message may be used for the MN to instruct the SN, or for a Centralized Unit (CU) to instruct a Distribute Unit (DU) to perform certain actions. For example, the MN may instruct the SN to establish or modify or release one SCG. That is to say, the CG-ConfigInfo message is sent by the MN to the SN, or is sent by the CU to the DU.

Optionally, the CG-ConfigInfo message may also include additional information, such as assisting an SgNB to set an SCG configuration.

It may be seen that for inter-node RRC messages (the CG-Config and the CG-ConfigInfo), in their structures of configuration restriction messages, only some variables that restrict an SCG frequency band combination, a power or a measurement frequency point and a measurement Identification (ID) are defined at present, but there is no restriction on the quantity of reporting criteria. If signaling interactions between the MN and the SN about the quantity of reporting criteria are lacked, it may be caused that a total quantity of reporting criteria configured for the terminal device exceeds a preset maximum value, thereby resulting in unnecessary reporting, increasing signaling overhead.

For example, under the NR-DC, a maximum quantity of reporting criteria that the terminal device may tolerate is 15, and the MN configures 10 reporting criteria for the terminal device, in which case the SN may configure 5 reporting criteria for the terminal device at most. If there is no signaling interaction between the MN and the SN about the quantity of reporting criteria, the SN cannot acquire the quantity of reporting criteria configured by the MN for the terminal device, then the quantity of reporting criteria configured by the SN for the terminal device may be greater than 5. At this time, unnecessary configuration of reporting criteria and waste of signaling overhead will occur, and a mismatch action between the network device and the terminal device may also occur.

In view of this, an embodiment of the present disclosure proposes a communication method for dual connectivity, which may reduce signaling overhead.

Figure 3:
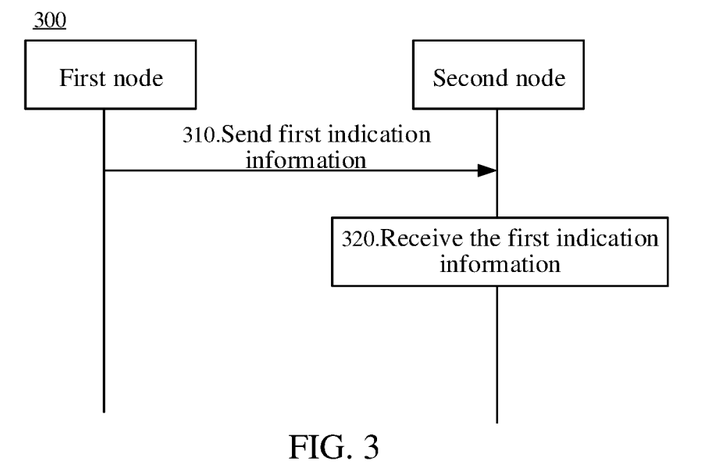
FIG. 3 is a schematic flow chart of a communication method for dual connectivity according to an embodiment of the present disclosure.

FIG. 3 is a schematic flow chart of a communication method 300 for dual connectivity according to an embodiment of the present disclosure. The method described in FIG. 3 may be performed by a network device. The network device may be, for example, the network device shown in FIG. 1. As shown in FIG. 3, the method 300 may include at least part of following contents.

In 310, a first node sends first indication information to a second node, wherein the first indication information is used for indicating a first quantity and/or a first actual limit value. Herein, the first quantity is a quantity of reporting criteria for measurement on a first cell configured by the first node, and the first actual limit value is an actual maximum quantity of reporting criteria for measurement on a second cell configurable by the second node.

Herein, the first quantity is an integer.

In 320, the second node receives the first indication information sent by the first node.

Herein, the first node and the second node are nodes of the first cell and the second cell under a dual connectivity network in which the terminal device is located, that is, the first node and the second node are connected with the terminal device at the same time.

In the embodiment of the present disclosure, the first node sends to the second node indication information indicating the quantity of reporting criteria for measurement on the first cell configured by the first node and/or the actual maximum quantity of reporting criteria for measurement on the second cell configurable by the second node, so that the second node may determine, based on the indication of the indication information, the quantity of reporting criteria for measurement on the first cell and/or the second cell that may be configured by itself, avoiding that the total quantity of reporting criteria configured by the first node and the second node exceeds a maximum quantity that the terminal device may tolerate, which may thereby reduce signaling overhead.

The term "and/or" in this document is merely an association relationship describing associated objects, indicating that there may be three relationships, for example, A and/or B may indicate three situations: A alone, A and B, and B alone.

Optionally, in the embodiment of the present disclosure, the first indication information may be carried in an RRC message, wherein the RRC message may be an inter-node RRC message between the first node and the second node, or may be another RRC message except the inter-node RRC message. Or, the first indication information may be carried in a Media Access Control (MAC) Control Element (CE) or another message.

Optionally, in the embodiment of the present disclosure, the first node may be MN or SN, and the second node may be MN or SN.

When the first node is the MN and the second node is the SN, the first indication information may be carried in the CG-ConfigInfo message in the inter-node RRC message. For example, the first indication information may be as shown below:

```
ConfigRestrictInfoSCG ::=       SEQUENCE {
    ...
    maxMeasFreqsSCG-NR              INTEGER(1..maxMeasFreqsMN)       OPTIONAL,
    maxMeasIdentitiesSCG-NR         INTEGER(1..maxMeasIdentitiesMN)  OPTIONAL,
    requestedReportingCriteriaSCG-NR  INTEGER(1..maxReportingCriteriaMN)
OPTIONAL.
    ...
}
```

When the first node is the SN and the second node is the MN, the first indication information may be carried in the CG-Config message in the inter-node RRC message. For example, the first indication information may be as shown below:

```
CG-Config ::=                   SEQUENCE {
    cg-Config                       CG-Config-IEs,
CG-Config-IEs ::=               SEQUENCE {
    configRestrictModReq            ConfigRestrictModReqSCG          OPTIONAL
ConfigRestrictModReqSCG ::=     SEQUENCE {
    requestedBC-MRDC                BandCombinationInfoSN            OPTIONAL,
    requestedP-MaxFR1               P-Max                            OPTIONAL,
    ...
    requestedReportingCriteria      ReportingCriteriaInfoSN          OPTIONAL.
}
```

For the NE-DC, the MN is a node of the NR system, and the SN is Evolved-Universal Mobile Telecommunications System Terrestrial Radio Access (E-UTRA). For the NR-DC, the MN may be a node with a working frequency band of FR1 in the NR system, and the SN may be a node with a working frequency band of FR2 in the NR system.

Of course, the MN and the SN may alternatively be nodes of another network standard (referred to as a first network standard for convenience of description) except Evolved Universal Terrestrial Radio Access Network (E-UTRAN) or the NR, such as nodes of a 2G network, nodes of a 3G network, or the like.

In the embodiment of the present disclosure, each measurement identification may correspond to one measurement object and one report configuration, and the reporting criteria may be expressed as a combination of the measurement object and the report configuration, that is, the measurement object and the report configuration have a cross mapping relationship. For example, if there are 4 measurement objects and 4 report configurations, the quantity of reporting criteria may be 16.

In the embodiments of the present disclosure, the reporting criteria may also be called measurement reporting criteria or another name, which is not specifically limited in the embodiment of the present disclosure.

When the first indication information is used for indicating the first quantity, the method 300 may further include that the second node determines the quantity of configured reporting criteria for measurement on the second cell according to the first quantity and a third preset limit value.

Herein, the third preset limit value is a preset maximum quantity of all reporting criteria that the first node and the second node are allowed to configure for the terminal device. Optionally, the third preset limit value may be preset according to a protocol; or, the third preset limit value may be negotiated by the first node and the second node; or, the third preset limit value may be determined by the first node or the second node. If the third preset limit value is determined by the first node, the first node may send first information to the second node, wherein the first information indicates the third preset limit value; similarly, if the third preset limit value is determined by the second node, the second node may send second information to the first node, wherein the second information indicates the third preset limit value. The first information or the second information may be carried in a same message as the first indication information, or may be carried in a different message from the first indication information.

Optionally, the quantity of reporting criteria configured by the second node is (the third preset limit value–the first quantity). For example, the quantity of reporting criteria configured by the first node for the terminal device, that is, the first quantity, is 10, and the third preset limit value is 26, then a maximum quantity of reporting criteria configured by the second node for the terminal device is 26−10=16, for example, the quantity of reporting criteria configured by the second node for the terminal device is 10. Herein, 16 is the first actual limit value, that is, the actual maximum quantity of reporting criteria for measurement on the second cell configurable by the second node.

It should be understood that specific examples in the embodiments of the present disclosure are only intended to help those skilled in the art to better understand the embodiments of the present disclosure, and are not intended to limit the scope of the embodiments of the present disclosure.

When the first indication information is used for indicating the first actual limit value, the method 300 may further include that the first node determines the first actual limit value according to the first quantity and the third preset limit value. Specifically, the first node may subtract the first quantity from the third preset limit value, so that the first actual limit value may be obtained.

Optionally, in the embodiment of the present disclosure, when the first node sends the first indication information to the second node, the second node may also send second indication information to the first node, wherein the second indication information may be used for indicating a second quantity and/or a second actual limit value, wherein the second quantity is a quantity of reporting criteria for measurement on the second cell configured by the second node, and the second actual limit value is an actual maximum quantity of reporting criteria for measurement on the first cell configurable by the first node.

The first indication information and the second indication information may be carried in different messages. The second indication information may be carried in an inter-node RRC message or another RRC message except the inter-node RRC message, or the second indication information may be carried in another message except RRC messages.

For example, when the first node is MN and the second node is SN, the second indication information may be carried in a CG-Config message in the inter-node RRC message; and when the first node is SN and the second node is MN, the second indication information may be carried in a CG-ConfigInfo message in the inter-node RRC message.

When the first indication information and the second indication information exist at the same time, the quantity of reporting criteria configured by the first node and the quantity of reporting criteria configured by the second node may have two cases, which are described below respectively.

Case 1

If a sum of the first quantity and the second quantity is less than or equal to the third preset limit value, for the first node, as an example, the first node may determine that the quantity of configured reporting criteria for measurement on the first cell is the first quantity, then the first node may configure the reporting criteria for measurement on the first cell based on the first quantity.

As another example, the first node may determine the quantity of configured reporting criteria based on the second quantity. Illustratively, the first node may take a value of the third preset limit value minus the second quantity as the quantity of configured reporting criteria.

In addition, if the first node is MN, the second node is SN, and the MN may configure reporting criteria for measurement on an SN cell of Inter-RAT. Therefore, the first node may also determine the quantity of configured reporting criteria for measurement on the SN cell based on the first quantity and/or the second quantity. Further, the first node may configure the reporting criteria for measurement on the SN cell according to the determined quantity of reporting criteria for measurement on the SN cell.

Similarly, for the second node, the second node may determine that the quantity of configured reporting criteria for measurement on the second cell is the second quantity, then the second node may configure the reporting criteria for measurement on the second cell based on the second quantity. Or, the second node may determine the quantity of configured reporting criteria based on the first quantity. Illustratively, the second node may take a value of the third preset limit value minus the first quantity as the quantity of configured reporting criteria.

In addition, if the first node is SN, the second node is MN, and the MN may configure reporting criteria for measurement on the SN cell of Inter-RAT. Therefore, the second node may also determine the quantity of configured reporting criteria for measurement on the SN cell based on the second quantity and the third preset limit value. Further, the second node may configure the reporting criteria for measurement on the SN cell according to the determined quantity of reporting criteria for measurement on the SN cell.

For example, the first quantity is 10, the second quantity is 8, the third preset limit value is 26, and a sum of the first quantity and the second quantity is less than the third preset value, then there may be 10 reporting criteria for measurement on the first cell configured by the first node, and there may be 8 reporting criteria for measurement on the second cell configured by the second node. If the first node is MN and the second node is SN, the first node may also determine that the quantity of configured reporting criteria for measurement on the SN cell is less than or equal to 8.

Case 2

When the first node is MN and the second node is SN, if a sum of the first quantity and the second quantity is greater than the third preset value, for the first node, as an example, the quantity of reporting criteria for measurement on the first cell configured by the first node may be the first quantity.

As another example, if the SN is a node of the NR system, then the first node may re-determine the quantity of configured reporting criteria for measurement on the first cell, for example, determine the second actual limit value as the quantity of configured reporting criteria for measurement on the first cell, or the determined quantity of reporting criteria is less than the second actual limit value.

As another example, the first node and the second node may renegotiate the quantity of reporting criteria configured by the first node and the quantity of reporting criteria configured by the second node according to the third preset limit value.

For the second node, as an example, the second node may determine the quantity of configured reporting criteria according to the first quantity and/or the first actual limit value.

For example, the second node may take a value obtained by subtracting the second quantity from the third preset limit value as the quantity of configured reporting criteria.

As another example, if the SN is a node of the NR system, the second node may determine the second quantity as the quantity of configured reporting criteria.

As another example, the first node and the second node may renegotiate the quantity of reporting criteria configured by the first node and the quantity of reporting criteria configured by the second node according to the third preset limit value.

For example, in the NE-DC, the first node is the E-UTRA, the second node is a node of the NR system, the first quantity is 5, the first actual limit value is 8, the second quantity is 10, the second actual limit value is 5, and the third preset limit value is 12. It may be seen that the quantity of reporting criteria configured by the E-UTRA and the quantity of reporting criteria configured by the node of the NR system nodes are larger than the third preset value. At this time, the node of the NR system may determine that the quantity of the configured reporting criteria for the second cell is 10, and the E-UTRA may determine that a maximum quantity of configured reporting criteria for the first cell is 2. Or, the nodes of the E-UTRA and the NR system may negotiate to jointly reduce the quantity of configured reporting criteria, for example, the E-UTRA reduces the quantity of reporting criteria to 4, and the node of the NR system reduces the quantity of reporting criteria to 8.

After the first node and the second node determine a final quantity of configured reporting criteria for measurement on a cell, it may configure the reporting criteria for the terminal device based on the determined final quantity of reporting criteria.

It should be noted that the second indication information may alternatively exist alone. That is, in a case that the first node does not send the first indication information to the second node, the second node may send the second indication information to the first node.

In a DC network, a total quantity of reporting criteria may be divided into two parts: one part is the quantity of reporting criteria for measurement on the MN cell and possible measurement on a cell in another network standard, and the other part is the quantity of reporting criteria for measurement on the SN cell and possible measurement on a cell in another network standard. Herein, the reporting criteria for measurement on the MN cell and possible measurement on a cell in another network standard are configured by the MN, so the quantity of reporting criteria in this part may not require signaling interaction between the MN and the SN. The reporting criteria for measurement on the SN cell and possible measurement on a cell in another network standard may be composed of two parts: one part may be reporting criteria for measurement on an Inter-Radio Access Technology (Inter-RAT) SN cell configured by the MN, and the other part may be reporting criteria configured by the SN for intra-frequency and inter-frequency measurements on the SN cell and possible measurement on a cell in another network standard. Therefore, the quantity of reporting criteria for measurement on the SN cell and possible measurement on a cell in another network standard requires interaction between the MN and the SN.

Optionally, in the embodiment of the present disclosure, the third preset limit value may be less than or equal to the first preset limit value. Herein, the first preset limit value is a preset maximum quantity of reporting criteria for measurement on a first type of cell which the first node and/or the second node are allowed to configure, and the second preset limit value is a preset maximum quantity of reporting criteria for measurement on a second type of cell which the first node and/or the second node are allowed to configure.

Illustratively, in the NE-DC, the first type of cell may be a cell of the NR system, and the second type of cell may be an E-UTRA cell. In the NR-DC, the first type of cell may be the E-UTRA, and the second type of cell may be a cell of the NR system with frequency ranges of the FR1 and the FR2.

To put it simply, for the NE-DC, if the first node is MN, the second node is SN, and there is no cell in the first network standard, then the first preset limit value may be a preset maximum quantity of reporting criteria for measurement on the NR cell that the NR is allowed to configure, and the second preset limit value may be a sum of a preset maximum quantity of reporting criteria for the E-UTRA cell that the E-UTRA is allowed to configure and a maximum quantity of reporting criteria for measurement on the E-UTRA cell of Inter-RAT configured by the NR.

In a possible embodiment, for the NE-DC, as an example, if the first node is MN and the second node is SN, the third quantity may meet the first preset limit value, and the fourth quantity may meet the second preset limit value. Herein, the third quantity may be a quantity of reporting criteria configured by the MN for intra-frequency and inter-frequency measurements on the MN cell and possible measurement on a cell in a first network standard, and the fourth quantity may be a sum of a quantity of reporting criteria configured by the SN for intra-frequency and inter-frequency measurements on the SN cell and possible measurement on a cell in the first network standard, and a quantity of reporting criteria for measurement on the SN cell configured by the MN, wherein the first network standard is a network standard except a network standard that the first node and the second node are in.

At this time, the first preset limit value and the second preset limit value may be determined by a quantity of carrier frequencies configured by the first cell and/or the second cell.

Optionally, the first preset limit value may meet $Y+Q*n$, wherein Y is a maximum quantity of reporting criteria for each inter-frequency cell, Q is a maximum quantity of reporting criteria for each intra-frequency cell, and n is a sum of the quantities of carrier frequencies of a serving cell configured by the first cell and the second cell.

Illustratively, Y may be 10 and Q may be 9.

Optionally, the second preset limit value may meet $X+Q*m$, wherein X is a constant, Q is a maximum quantity of reporting criteria for each intra-frequency cell, and m is a quantity of carrier frequencies of a Secondary Cell (Scell) configured by the second cell. Herein, X may be a constant specified by a protocol, or a constant determined by the node of the NR system.

Illustratively, $Q=9$. Illustratively again, X may be 17, and at this time, there is one SCell, so m is 1.

As another example, if the first node is SN and the second node is MN, the fifth quantity may meet the first preset limit value and the sixth quantity may meet the second preset limit value. Herein, the fifth quantity is a sum of a quantity of reporting criteria for intra-frequency and inter-frequency measurements on the NR cell configured by the MN and a quantity of reporting criteria for possible measurement on a cell in a first network standard. The sixth quantity may include three parts: the first part is a quantity of reporting criteria for intra-frequency and inter-frequency measurements on the SN cell configured by the SN, the second part is a quantity of reporting criteria for measurement on a cell in the first network standard configured by the SN, and the third part is a quantity of reporting criteria for measurement on the SN cell configured by the MN.

In another possible embodiment, for the NR-DC, as an example, a quantity of reporting criteria for possible measurement on a cell in a first network standard configured by the first node and/or the second node may meet the first preset limit value, and a sum of the quantities of reporting criteria for intra-frequency and inter-frequency measurements on the first cell and the second cell configured by the first node and the second node may meet the second preset limit value.

As another example, a sum of the quantities of reporting criteria for intra-frequency and inter-frequency measurements of the first cell measurement and the second cell measurement configured by the first node and the second node may meet the first preset limit value, and a sum of the quantities of reporting criteria for possible measurement on a cell in the first network standard configured by the second node may meet the second preset limit value.

In this case, the first preset limit value and the second preset limit value may be determined based on the quantity of carrier frequencies configured by the first cell and/or the second cell.

Optionally, the first preset limit value may be $X+Q*h$, wherein X is a constant, Q is a maximum quantity of reporting criteria for each intra-frequency cell, and h is a quantity of carrier frequencies configured by a cell in the first network standard. For example, a typical value of Q may be 9.

Optionally, the second preset limit value may be $Y+Q*(m1+m2)$, wherein Y is a maximum quantity of reporting criteria for each inter-frequency cell, Q is a maximum quantity of reporting criteria for each intra-frequency cell, and m1 and m2 are a quantity of serving carrier frequencies configured by the first cell and the second cell respectively.

Optionally, when the first node is a secondary node, the first quantity may be less than or equal to a maximum quantity of reports for measurement on the first cell that the first node is allowed to configure preset in the second preset limit value.

For example, in the NE-DC, the first node is E-UTRA, and if there is no first network standard and the second preset limit value is a preset maximum quantity of reporting criteria for measurement on the E-UTRA cell that the node of the NR system and the E-UTRA are allowed to configure, then the first quantity configured by the E-UTRA may be less than or equal to a maximum quantity of reports for measurement on the E-UTRA cell that the E-UTRA is allowed to configure preset in a preset limit value.

Illustratively, the first quantity may meet $Y+Q*m1$, wherein Y is a maximum quantity of reporting criteria for each inter-frequency cell, Q is a maximum quantity of reporting criteria for each intra-frequency cell, and m1 is a quantity of serving carrier frequencies configured by the first cell.

Herein, a typical value of Y may be 10, and a typical value of Q may be 9.

In addition, the first actual limit value may be less than or equal to a maximum quantity of reports for measurement on the second cell that the second node is allowed to configure preset in the first preset limit value.

Optionally, when the second node is a secondary node, the second quantity may be less than or equal to a maximum quantity of reports for measurement on the second cell configured by the second node preset in a second preset value.

In addition, the second actual limit value may be less than or equal to a maximum quantity of reports for measurement on the first cell that the first node is allowed to configure preset in the first preset limit value.

It should be understood that in the embodiments of the present disclosure, "first", "second" and "third" are only for distinguishing different objects, but do not construct limitation on the scope of the embodiments of the present disclosure.

It should be noted that in the NR-DC, a case of the NE-DC may exist. For example, in the NR system in the NE-DC, there may be a node of the NR system with a working frequency band of FR1 and a node of the NR system with a working frequency band of FR2. In this case, an implementation of a quantity of reporting criteria configurable by the node of the NR system with a working frequency band of FR1 and the node of the NR system with a working frequency band of FR2 may refer to the description of the foregoing content, which is not repeated here again for the sake of brevity.

The preferred embodiments of the present disclosure have been described in detail above with reference to the attached drawings, but the present disclosure is not limited to the specific details of the above embodiments. Within the technical conception scope of the present disclosure, various simple modifications may be made to the technical solution of the present disclosure, wherein these simple modifications all belong to the protection scope of the present disclosure.

For example, without contradiction, the specific technical features described in the above specific embodiments may be combined in any suitable mode. In order to avoid unnecessary repetition, various possible combination modes are not explained separately in the present disclosure.

For another example, various different embodiments of the present disclosure may be combined arbitrarily, and as long as they do not violate the idea of the present disclosure, they should also be regarded as the contents disclosed in the present disclosure.

It should be understood that sequence numbers of the foregoing processes do not mean execution sequences in various method embodiments of the present disclosure. The execution sequences of the processes should be determined according to functions and internal logic of the processes, and should not be construed as any limitation on the implementation processes of the embodiments of the present disclosure.

The communication method according to the embodiments of the present disclosure have been described in detail above, and a communication apparatus according to embodiments of the present disclosure will be described below with reference to FIGS. 4 to 6. The technical features described in the method embodiments are applicable to following apparatus embodiments.

Figure 4:
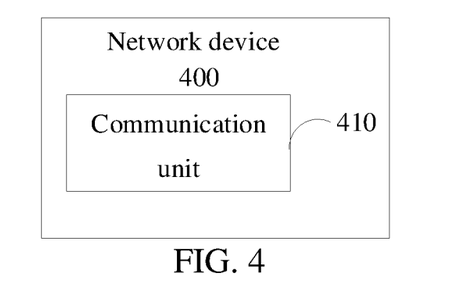
FIG. 4 is a schematic block diagram of a network device according to an embodiment of the present disclosure.

FIG. 4 shows a schematic block diagram of a network device 400 according to an embodiment of the present disclosure. As shown in FIG. 4, the network device 400 includes: a communication unit 410, configured to send first indication information to a second node, wherein the first indication information is used for indicating a first quantity and/or a first actual limit value, wherein the first quantity is a quantity of reporting criteria for measurement on a first cell configured by the first node, the first actual limit value is an actual maximum quantity of reporting criteria for measurement on a second cell configurable by the second node, and the first node and the second node are respectively nodes of the first cell and the second cell under a dual connectivity network in which a terminal device is located.

Optionally, in the embodiment of the present disclosure, the first indication information is carried in an inter-node RRC message between the first node and the second node.

Optionally, in the embodiment of the present disclosure, the first node is a master node or a secondary node, and the second node is a master node or a secondary node.

Optionally, in the embodiment of the present disclosure, the communication unit 410 is further configured to receive second indication information sent by the second node, wherein the second indication information is used for indicating a second quantity and/or a second actual limit value, wherein the second quantity is a quantity of reporting criteria for measurement on the second cell configured by the second node, and the second actual limit value is an actual maximum quantity of reporting criteria for measurement on the first cell configurable by the first node.

Optionally, in the embodiment of the present disclosure, the second indication information is carried in an inter-node RRC message between the first node and the second node.

Optionally, in the embodiment of the present disclosure, if a sum of the first quantity and the second quantity is less than or equal to a third preset limit value, the network device 400 further includes a processing unit 420, configured to configure the reporting criteria for measurement on the first cell and/or the second cell based on the first quantity, wherein the third preset limit value is a preset maximum quantity of all reporting criteria that the first node and the second node are allowed to configure.

Optionally, in the embodiment of the present disclosure, if a sum of the first quantity and the second quantity is greater than a third preset limit value, the network device 400 further includes a processing unit 420, configured to determine a final quantity of configured reporting criteria for measurement on the first cell and/or the second cell according to the first quantity; or according to the second quantity and/or the second actual limit value, determine a final quantity of configured reporting criteria for measurement on the first cell and/or the second cell, wherein the third preset limit value is a preset maximum quantity of all reporting criteria that the first node and the second node are allowed to configure for the terminal device.

Optionally, in the embodiment of the present disclosure, the processing unit 420 is further configured to configure the reporting criteria for measurement on the first cell and/or the second cell based on a final quantity of the reporting criteria.

Optionally, in the embodiment of the present disclosure, the third preset limit value is less than or equal to a sum of the first preset limit value and the second preset limit value, wherein the first preset limit value is a preset maximum quantity of reporting criteria for measurement on a first type of cell which the first node and/or the second node are allowed to configure, the second preset limit value is a preset maximum quantity of reporting criteria for measurement on a second type of cell which the first node and/or the second node are allowed to configure, and the third preset limit value is a preset maximum quantity of all reporting criteria that the first node and the second node are allowed to configure for the terminal device.

Optionally, in the embodiment of the present disclosure, the first preset limit value and the second preset limit value are determined based on a quantity of carrier frequencies configured by the first cell and/or the second cell.

Optionally, in the embodiment of the present disclosure, a third quantity meets the first preset limit value, and a fourth quantity meets the second preset limit value.

Herein, the third quantity is a quantity of reporting criteria for intra-frequency and inter-frequency measurements on the first cell and measurement on a cell in a first network standard configured by the first node, and a fourth quantity is a sum of a quantity of reporting criteria for intra-frequency and inter-frequency measurements on the second cell and measurement on a cell in the first network standard configured by the second node and a quantity of reporting criteria for measurement on the second cell configured by the first node, wherein the first network standard is a network standard except a network standard that the first node and the second node are in.

Optionally, in the embodiment of the present disclosure, the first preset limit value is $Y+Q*n$, wherein Y is a maximum quantity of reporting criteria for each inter-frequency cell, Q is a maximum quantity of reporting criteria for each intra-frequency cell, and n is a sum of the quantities of carrier frequencies of a serving cell configured by the first cell and the second cell; the second preset limit value is $X+Q*m$, wherein X is a constant specified by a protocol, and m is a quantity of carrier frequencies of a secondary cell configured by the second cell.

Optionally, in the embodiment of the present disclosure, a quantity of reporting criteria for measurement on a cell in the first network standard configured by the first node and/or the second node meets the first preset limit value, and a sum of quantities of reporting criteria for intra-frequency and inter-frequency measurements on the first cell and the second cell configured by the first node and the second node meets the second preset limit value, wherein the first network standard is a network standard except a network standard that the first node and the second node are in.

Optionally, in the embodiment of the present disclosure, the first preset limit value is $X+Q*h$, wherein X is a constant specified by a protocol, Q is a maximum quantity of reporting criteria for each intra-frequency cell, and h is a quantity of carrier frequencies configured by a cell in the first network standard.

The second preset limit value is Y+Q*(m1+m2), wherein Y is a maximum quantity of reporting criteria for each inter-frequency cell, and m1 and m2 are a quantity of serving carrier frequencies configured by the first cell and the second cell respectively.

Optionally, in the embodiment of the present disclosure, the first quantity is less than or equal to a maximum quantity of reports for measurement on the first cell which the first node is allowed to configure preset in the second preset limit value, and the first quantity is an integer.

Optionally, in the embodiment of the present disclosure, the first quantity is Y+Q*m1, wherein Y is a maximum quantity of reporting criteria for each inter-frequency cell, Q is a maximum quantity of reporting criteria for each intra-frequency cell, and m1 is a quantity of serving carrier frequencies configured by the first cell.

Optionally, in the embodiment of the present disclosure, if the first indication information is used for indicating the first actual limit value, the network device 400 further includes a processing unit 420, configured to determine the first actual limit value according to the first quantity and a third preset limit value, wherein the third preset limit value is a preset maximum quantity of all reporting criteria that the first node and the second node are allowed to configure for the terminal device.

Optionally, in the embodiment of the present disclosure, the first actual limit value is a difference between the third preset limit value and the first quantity, wherein the difference is an integer.

Optionally, in the embodiment of the present disclosure, the third preset limit value is preconfigured.

It should be understood that the network device 400 may correspond to the first node in the method 300, and may implement the corresponding operations of the first node in the method 300, which is not repeated here again for the sake of brevity.

Figure 5:
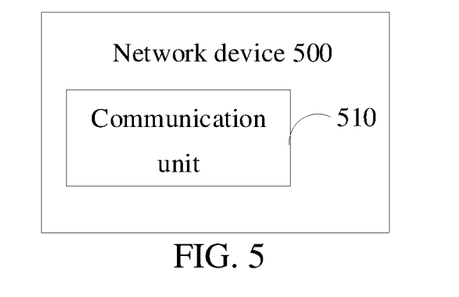
FIG. 5 is a schematic block diagram of a network device according to an embodiment of the present disclosure.

FIG. 5 shows a schematic block diagram of a network device 500 according to an embodiment of the present disclosure. As shown in FIG. 5, the network device 500 includes: a communication unit 510, configured to receive first indication information sent by a first node, wherein the first indication information is used for indicating a first quantity and/or a first actual limit value, wherein the first quantity is a quantity of reporting criteria for measurement on a first cell configured by the first node, the first actual limit value is an actual maximum quantity of reporting criteria for measurement on a second cell configurable by the second node, and the first node and the second node are respectively nodes of the first cell and the second cell under a dual connectivity network in which a terminal device is located.

Optionally, in the embodiment of the present disclosure, the first indication information is carried in an inter-node RRC message between the first node and the second node.

Optionally, in the embodiment of the present disclosure, the first node is a master node or a secondary node, and the second node is a master node or a secondary node.

Optionally, in the embodiment of the present disclosure, the communication unit 510 is further configured to send second indication information to the first node, wherein the second indication information is used for indicating a second quantity and/or a second actual limit value, wherein the second quantity is a quantity of reporting criteria for measurement on the second cell configured by the second node, and the second actual limit value is an actual maximum quantity of reporting criteria for measurement on the first cell configurable by the first node.

Optionally, in the embodiment of the present disclosure, the second indication information is carried in an inter-node RRC message between the first node and the second node.

Optionally, in the embodiment of the present disclosure, if a sum of the first quantity and the second quantity is less than or equal to a third preset limit value, the network device 500 further includes a processing unit 520, configured to configure the reporting criteria for measurement on the first cell and/or the second cell based on the second quantity, wherein the third preset limit value is a preset maximum quantity of all reporting criteria that the first node and the second node are allowed to configure.

Optionally, in the embodiment of the present disclosure, if a sum of the first quantity and the second quantity is greater than a third preset limit value, the network device 500 further includes a processing unit 520, configured to determine a final quantity of the configured reporting criteria for measurement on the first cell and/or the second cell according to the second quantity; or according to the first quantity and/or the first actual limit value, determine a final quantity of the configured reporting criteria for measurement on the first cell and/or the second cell, wherein the third preset limit value is a preset maximum quantity of all reporting criteria that the first node and the second node are allowed to configure for the terminal device.

Optionally, in the embodiment of the present disclosure, the processing unit 520 is further configured to configure the reporting criteria for measurement on the first cell and/or the second cell based on a final quantity of the reporting criteria.

Optionally, in the embodiment of the present disclosure, if the second first indication information is used for indicating the second actual limit value, the network device 500 further includes a processing unit 520, configured to determine the first actual limit value according to the second quantity and a third preset limit value, wherein the third preset limit value is a preset maximum quantity of all reporting criteria that the first node and the second node are allowed to configure for the terminal device.

Optionally, in the embodiment of the present disclosure, the third preset limit value is less than or equal to a sum of the first preset limit value and the second preset limit value, wherein the first preset limit value is a preset maximum quantity of reporting criteria for measurement on a first type of cell which the first node and/or the second node are allowed to configure, the second preset limit value is a preset maximum quantity of reporting criteria for measurement on a second type of cell which the first node and/or the second node are allowed to configure, and the third preset limit value is a preset maximum quantity of all reporting criteria that the first node and the second node are allowed to configure for the terminal device.

Optionally, in the embodiment of the present disclosure, the first preset limit value and the second preset limit value are determined based on a quantity of carrier frequencies configured by the first cell and/or the second cell.

Optionally, in the embodiment of the present disclosure, a third quantity meets the first preset limit value, and a fourth quantity meets the second preset limit value.

Herein, the third quantity is a quantity of reporting criteria for intra-frequency and inter-frequency measurements on the first cell and measurement on a cell in a first network standard configured by the first node, and a fourth quantity is a sum of a quantity of reporting criteria for intra-frequency and inter-frequency measurements on the second cell and measurement on a cell in the first network standard configured by the second node and a quantity of reporting criteria for measurement on the second cell configured by the first node, wherein the first network standard is a network standard except a network standard that the first node and the second node are in.

Optionally, in the embodiment of the present disclosure, the first preset limit value is Y+Q*n, wherein Y is a maximum quantity of reporting criteria for each inter-frequency cell, Q is a maximum quantity of reporting criteria for each intra-frequency cell, and n is a sum of the quantities of carrier frequencies of a serving cell configured by the first cell and the second cell; and the second preset limit value is X+Q*m, wherein X is a constant specified by a protocol, and m is a quantity of carrier frequencies of a secondary cell configured by the second cell.

Optionally, in the embodiment of the present disclosure, a quantity of reporting criteria for measurement on a cell in the first network standard configured by the first node and/or the second node meets the first preset limit value, and a sum of quantities of reporting criteria for intra-frequency and inter-frequency measurements on the first cell and the second cell configured by the first node and the second node meets the second preset limit value, wherein the first network standard is a network standard except a network standard that the first node and the second node are in.

Optionally, in the embodiment of the present disclosure, the first preset limit value is X+Q*h, wherein X is a constant specified by a protocol, Q is a maximum quantity of reporting criteria for each intra-frequency cell, and h is a quantity of carrier frequencies configured by a cell in the first network standard.

The second preset limit value is Y+Q*(m1+m2), wherein Y is a maximum quantity of reporting criteria for each inter-frequency cell, and m1 and m2 are a quantity of serving carrier frequencies configured by the first cell and the second cell respectively.

Optionally, in the embodiment of the present disclosure, the first quantity is less than or equal to a maximum quantity of reports for measurement on the first cell which the first node is allowed to configure preset in the second preset limit value, and the first quantity is an integer.

Optionally, in the embodiment of the present disclosure, the first quantity is Y+Q*m1, wherein Y is a maximum quantity of reporting criteria for each inter-frequency cell, Q is a maximum quantity of reporting criteria for each intra-frequency cell, and m1 is a quantity of serving carrier frequencies configured by the first cell.

Optionally, in the embodiment of the present disclosure, the first actual limit value is equal to a difference between the third preset limit value and the first quantity, wherein the difference is an integer.

Optionally, in the embodiment of the present disclosure, the third preset limit value is preconfigured.

It should be understood that the network device 500 may correspond to the second node in the method 300, and may implement the corresponding operations of the second node in the method 300, which is not repeated here again for the sake of brevity.

Figure 6:
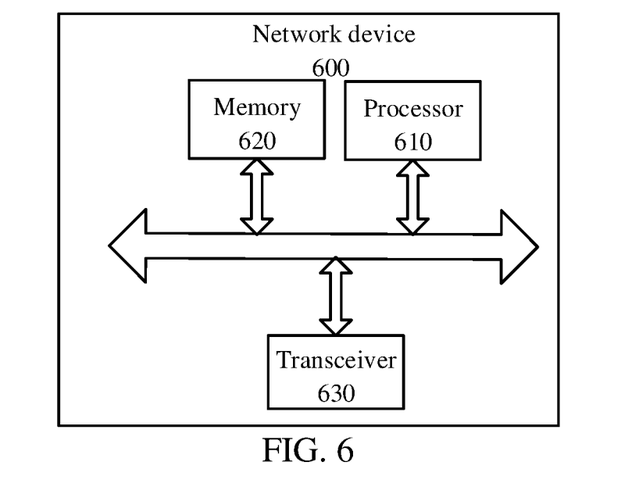
FIG. 6 is a schematic block diagram of a network device according to an embodiment of the present disclosure.

FIG. 6 is a schematic structural diagram of a network device 600 according to an embodiment of the present disclosure. The network device 600 shown in FIG. 6 includes a processor 610. The processor 610 may call and run a computer program from a memory to implement a method in the embodiment of the present disclosure.

Optionally, as shown in FIG. 6, the network device 600 may further include a memory 620. The processor 610 may call and run a computer program from the memory 620 to implement the method in the embodiment of the present disclosure.

The memory 620 may be a separate device independent of the processor 610 or may be integrated in the processor 610.

Optionally, as shown in FIG. 6, the network device 600 may further include a transceiver 630, and the processor 6710 may control the transceiver 630 to communicate with another device. Specifically, the processor 6710 may control the transceiver 630 to send information or data to another device, or to receive information or data sent by another device.

The transceiver 630 may include a transmitter and a receiver. The transceiver 630 may further include antennas, and the quantity of antennas may be one or more.

Optionally, the network device 600 may specifically be a first node of the embodiment of the present disclosure, and the network device 600 may implement the corresponding processes implemented by the first node in various methods of the embodiments of the present disclosure, which are not repeated here again for the sake of brevity.

Optionally, the network 600 may specifically be a second node of the embodiment of the present disclosure, and the network 600 may implement the corresponding processes implemented by the second node in various methods of the embodiments of the present disclosure, which are not repeated here again for the sake of brevity.

Figure 7:
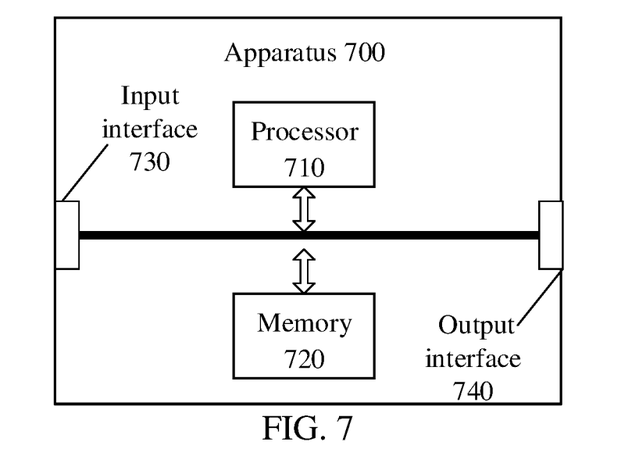
FIG. 7 is a schematic block diagram of an apparatus according to an embodiment of the present disclosure.

FIG. 7 is a schematic structural diagram of an apparatus of an embodiment of the present disclosure. An apparatus 700 shown in FIG. 7 includes a processor 710. The processor 710 may call and run a computer program from a memory to implement the method in the embodiment of the present disclosure.

Optionally, as shown in FIG. 7, the apparatus 700 may further include a memory 720. The processor 710 may call and run a computer program from the memory 720 to implement the method in the embodiment of the present disclosure.

The memory 720 may be a separate device independent of the processor 710 or may be integrated in the processor 710.

Optionally, the apparatus 700 may further include an input interface 730. The processor 710 may control the input interface 730 to communicate with other devices or chips. Specifically, the processor 710 may acquire information or data sent by other devices or chips.

Optionally, the apparatus 700 may further include an output interface 740. The processor 710 may control the output interface 740 to communicate with other devices or chips. Specifically, the processor 710 may output information or data to other devices or chips.

Optionally, the apparatus may be applied to a first node of the embodiment of the present disclosure, and the apparatus may implement the corresponding processes implemented by the first node in various methods of the embodiments of the present disclosure, which are not repeated here again for the sake of brevity.

Optionally, the apparatus may be applied to a second node of the embodiment of the present disclosure, and the apparatus may implement the corresponding processes implemented by the second node in various methods of the embodiments of the present disclosure, which are not repeated here again for the sake of brevity.

Optionally, the apparatus 700 may be a chip. It should be understood that the chip mentioned in the embodiment of the present disclosure may be referred to as a system-level chip, a system chip, a chip system or a system-on-chip, etc.

It should be understood that, the processor in the embodiment of the present disclosure may be an integrated circuit chip having a signal processing capability. In an implementation process, the steps of the foregoing method embodiments may be implemented by using an integrated logic circuit of hardware in the processor or instructions in a form of software. The processor may be a general purpose processor, a digital signal processor (Digital Signal Processing, DSP), an application specific integrated circuit (Application Specific Integrated Circuit, ASIC), a field programmable gate array (Field Programmable Gate Array, FPGA) or another programmable logic device, a discrete gate or a transistor logic device, or a discrete hardware component. The processor may implement or perform methods, steps and logical block diagrams disclosed in the embodiment of the present disclosure. The general purpose processor may be a microprocessor, or the processor may be any conventional processor or the like. The steps of the method disclosed with reference to this embodiment of the present disclosure may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in the embodiment of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM), and a direct rambus dynamic random access memory (Direct Rambus RAM, DR RAM). It should be noted that the memory in the systems and methods described in this specification is aimed at including but being not limited to these and any memory of another proper type.

It should be understood that, the foregoing memory is an example for illustration and should not be construed as limiting. For example, optionally, the memory in the embodiments of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the embodiments of the present disclosure are intended to include, but are not limited to, these and any other suitable types of memories.

Figure 8:
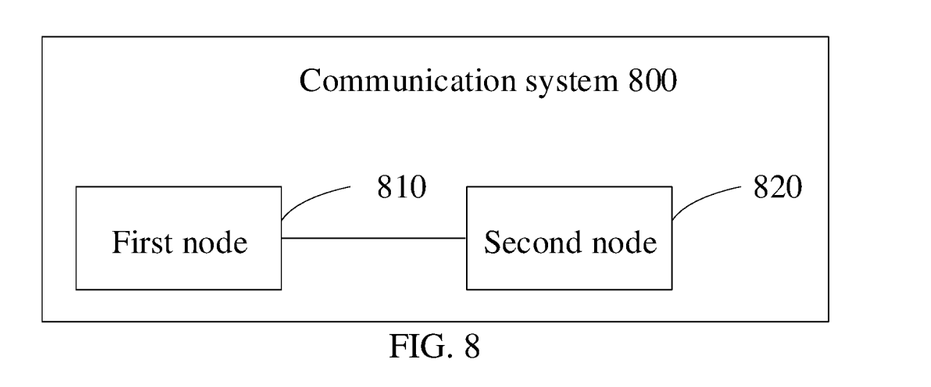
FIG. 8 is a schematic block diagram of a communication system according to an embodiment of the present disclosure.

FIG. 8 is a schematic block diagram of a communication system 800 according to an embodiment of the present disclosure. As shown in FIG. 8, the communication system 800 includes a first node 810 and a second node 820.

Herein, the first node 810 may be configured to implement the corresponding functions implemented by the first node in the above method, and the second node 820 may be configured to implement the corresponding functions implemented by the second node in the above method, which are not repeated here again for the sake of brevity.

An embodiment of the present disclosure further provides a computer readable storage medium configured to store a computer program.

Optionally, the computer readable storage medium may be applied in a first node of the embodiment of the present disclosure, and the computer program causes a computer to perform corresponding processes implemented by the first node in various methods of the embodiments of the present disclosure, which are not repeated here again for the sake of brevity.

Optionally, the computer readable storage medium may be applied in a second node of the embodiment of the present disclosure, and the computer program causes a computer to perform corresponding processes implemented by the second node in various methods of the embodiments of the present disclosure, which are not repeated here again for the sake of brevity.

An embodiment of the present disclosure also provides a computer program product including computer program instructions.

Optionally, the computer program product may be applied to a first node in the embodiment of the present disclosure, and the computer program instructions cause a computer to perform the corresponding processes implemented by the first node in various methods of the embodiments of the present disclosure, which are not repeated here again for the sake of brevity.

Optionally, the computer program product may be applied to a second node in the embodiment of the present disclosure, and the computer program instructions cause a computer to perform the corresponding processes implemented by the second node in various methods of the embodiments of the present disclosure, which are not repeated here again for the sake of brevity.

An embodiment of the present disclosure also provides a computer program.

Optionally, the computer program may be applied in a first node of the embodiment of the present disclosure. When the computer program is run on a computer, the computer is caused to perform the corresponding processes implemented by the first node in various methods of the embodiment of the present disclosure, which are not repeated here again for the sake of brevity.

Optionally, the computer program may be applied in a second node of the embodiment of the present disclosure. When the computer program is run on a computer, the computer is caused to perform the corresponding processes implemented by the second node in various methods of the embodiment of the present disclosure, which are not repeated here again for the sake of brevity.

Those of ordinary skill in the art will recognize that the exemplary elements and algorithm acts described in combination with the embodiments disclosed herein may be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method embodiments and will not be described here.

In several embodiments provided by the present disclosure, it should be understood that the disclosed systems, apparatuses and methods may be implemented in other ways. For example, the apparatus embodiments described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the embodiments.

In addition, various functional units in various embodiments of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various embodiments of the present disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What are described above are merely exemplary embodiments of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A communication method for dual connectivity, comprising:
  sending, by a first node, first indication information to a second node, wherein the first indication information is used for indicating a first actual limit value, wherein the first actual limit value is an actual maximum quantity of reporting criteria for measurement on a second cell configurable by the second node, and the first node and the second node are respectively nodes of the first cell and the second cell under a dual connectivity network in which a terminal device is located.

2. The method according to claim 1, wherein the first indication information is carried in an inter-node Radio Resource Control (RRC) message between the first node and the second node.

3. The method according to claim 1, wherein the first node is a master node, and the second node is a secondary node.

4. The method according to claim 1, wherein the method further comprises:
  requesting, by the first node, the second node to send second indication information, wherein the second indication information is used for indicating a second quantity, wherein the second quantity is a quantity of reporting criteria for measurement on the second cell configured by the second node.

5. The method according to claim 4, wherein the second indication information is carried in an inter-node RRC message between the first node and the second node.

6. The method according to claim 4, wherein if a sum of the first quantity and the second quantity is less than or equal to a third preset limit value, the method further comprises:
  configuring, by the first node, the reporting criteria for measurement on the second cell based on the first quantity, wherein the third preset limit value is a preset maximum quantity of all reporting criteria that the first node and the second node are allowed to configure.

7. The method according to claim 4, wherein if a sum of the first quantity and the second quantity is greater than a third preset limit value, the method further comprises:
  according to the second quantity and/or the second actual limit value, determining, by the first node, a final quantity of configured reporting criteria for measurement on the first cell and/or the second cell, wherein the third preset limit value is a preset maximum quantity of all reporting criteria that the first node and the second node are allowed to configure for the terminal device.

8. The method according to claim 1, wherein a third preset limit value is less than or equal to a sum of a first preset limit value and a second preset limit value, wherein the first preset limit value is a preset maximum quantity of reporting criteria for measurement on a first type of cell which the first node and/or the second node are allowed to configure, the second preset limit value is a preset maximum quantity of reporting criteria for measurement on a second type of cell which the first node and/or the second node are allowed to configure, and the third preset limit value is a preset maximum quantity of all reporting criteria that the first node and the second node are allowed to configure for the terminal device.

9. The method according to claim 8, wherein the first preset limit value and the second preset limit value are determined based on a quantity of carrier frequencies configured by the first cell and/or the second cell.

10. The method according to claim 8, wherein a third quantity meets the first preset limit value, and a fourth quantity meets the second preset limit value;
  wherein, the third quantity is a quantity of reporting criteria for intra-frequency and inter-frequency measurements on the first cell and measurement on a cell in a first network standard configured by the first node, and the fourth quantity is a sum of a quantity of reporting criteria for intra-frequency and inter-frequency measurements on the second cell and measurement on a cell in the first network standard configured by the second node and a quantity of reporting criteria for measurement on the second cell configured by the first node, wherein the first network standard is a network standard except a network standard that the first node and the second node are in.

11. The method according to claim 10, wherein the first preset limit value is $Y+Q*n$, wherein Y is a maximum quantity of reporting criteria for each inter-frequency cell, Q is a maximum quantity of reporting criteria for each intra-frequency cell, and n is a sum of quantities of carrier frequencies of a serving cell configured by the first cell and the second cell; and the second preset limit value is $X+Q*m$, wherein X is a constant specified by a protocol, and m is a quantity of carrier frequencies of a secondary cell configured by the second cell.

12. The method according to claim 8, wherein a quantity of reporting criteria for measurement on a cell in a first network standard configured by the first node and/or the second node meets the first preset limit value, and a sum of quantities of reporting criteria for intra-frequency and inter-frequency measurements on the first cell and the second cell configured by the first node and the second node meets the second preset limit value, wherein the first network standard is a network standard except a network standard that the first node and the second node are in.

13. The method according to claim 12, wherein the first preset limit value is $X+Q*h$, wherein X is a constant specified by a protocol, Q is a maximum quantity of reporting criteria for each intra-frequency cell, and h is a quantity of carrier frequencies configured by the cell in the first network standard;

the second preset limit value is $Y+Q*(m1+m2)$, wherein Y is a maximum quantity of reporting criteria for each inter-frequency cell, and m1 and m2 are a quantity of serving carrier frequencies configured by the first cell and the second cell respectively.

14. The method according to claim 8, wherein the first quantity is less than or equal to a maximum quantity of reports for measurement on the first cell which the first node is allowed to configure preset in the second preset limit value, and the first quantity is an integer.

15. A network device, comprising a processor and a memory, wherein the memory is configured to store a computer program, and the processor is configured to call and run the computer program stored in the memory to execute the method according to claim 1.

16. A communication method for dual connectivity, comprising:

receiving, by a second node, first indication information sent by a first node, wherein the first indication information is used for indicating a first actual limit value, wherein the first actual limit value is an actual maximum quantity of reporting criteria for measurement on a second cell configurable by the second node, and the first node and the second node are respectively nodes of the first cell and the second cell under a dual connectivity network in which a terminal device is located.

17. The method according to claim 16, wherein the method further comprises:

sending, by the second node, second indication information to the first node according to a request of the first node, wherein the second indication information is used for indicating a second quantity, wherein the second quantity is a quantity of reporting criteria for measurement on the second cell configured by the second node.

18. The method according to claim 17, wherein if a sum of the first quantity and the second quantity is less than or equal to a third preset limit value, the method further comprises:

configuring, by the second node, the reporting criteria for measurement on the second cell based on the second quantity, wherein the third preset limit value is a preset maximum quantity of all reporting criteria that the first node and the second node are allowed to configure.

19. The method according to claim 17, wherein if a sum of the first quantity and the second quantity is greater than a third preset limit value, the method further comprises:

according to the first quantity and/or the first actual limit value, determining, by the second node, a final quantity of configured reporting criteria for measurement on the first cell and/or the second cell, wherein the third preset limit value is a preset maximum quantity of all reporting criteria that the first node and the second node are allowed to configure for the terminal device.

20. The method according to claim 16, wherein a third preset limit value is less than or equal to a sum of a first preset limit value and a second preset limit value, wherein the first preset limit value is a preset maximum quantity of reporting criteria for measurement on a first type of cell which the first node and/or the second node are allowed to configure, the second preset limit value is a preset maximum quantity of reporting criteria for measurement on a second type of cell which the first node and/or the second node are allowed to configure, and the third preset limit value is a preset maximum quantity of all reporting criteria that the first node and the second node are allowed to configure for the terminal device.

* * * * *